United States Patent [19]

Skoultchi et al.

[11] Patent Number: 4,602,073

[45] Date of Patent: Jul. 22, 1986

[54] ADHESIVE COMPOSITIONS

[75] Inventors: Martin M. Skoultchi, Somerset; Alfred G. Battaglia, Berkeley Heights, both of N.J.

[73] Assignee: National Starch and Chemical Corporation, Bridgewater, N.J.

[21] Appl. No.: 742,488

[22] Filed: Jun. 7, 1985

[51] Int. Cl.$^4$ .............................................. C08F 4/00
[52] U.S. Cl. ................................ 526/208; 526/219.2
[58] Field of Search ............... 526/208, 218.1, 219, 526/219.1, 219.2

[56] References Cited

U.S. PATENT DOCUMENTS

| | | | |
|---|---|---|---|
| 3,332,936 | 7/1967 | Diekmann | 526/219 |
| 3,591,438 | 7/1971 | Toback et al. | 156/310 |
| 3,616,040 | 10/1971 | Toback | 156/310 |
| 3,880,956 | 4/1975 | Skoultchi | 260/89.5 |
| 3,890,407 | 6/1975 | Briggs, Jr. et al. | 260/878 R |
| 4,025,502 | 5/1977 | MacLeay | 526/219 |
| 4,028,344 | 6/1977 | Lange | 526/219 |
| 4,106,971 | 8/1978 | Briggs, Jr. et al. | 156/310 |
| 4,113,792 | 9/1978 | Pastor et al. | 260/834 |
| 4,170,612 | 10/1979 | Pastor et al. | 525/101 |
| 4,182,644 | 1/1980 | Briggs, Jr. et al. | 156/310 |
| 4,451,615 | 5/1984 | Charnock | 525/98 |

*Primary Examiner*—Paul R. Michl
*Attorney, Agent, or Firm*—Edwin M. Szala; Ellen T. Dec

[57] ABSTRACT

Fast curing, two part adhesives and articles bonded therewith are disclosed. The adhesives comprise a first part of free radical polymerizable acrylic monomers and a diazonium salt sufficient to initiate polymerization of said monomers. A second part comprises an activator to induce the free radical decomposition of the diazonium salt, said activator being an aldehyde-amine condensation product. The described curable adhesives are formed just prior to use where the second part containing the activator is placed in contact with the first part. Both the first part and second part component exhibit a high degree of stability when stored separately.

22 Claims, No Drawings

ADHESIVE COMPOSITIONS

BACKGROUND OF THE INVENTION

1. Field of Invention

This invention relates to fast curing, two part adhesives and to articles bonded therewith. The curable adhesives described herein comprise a first part component of free radical initiated polymerizable acrylic monomers and a diazonium salt. A second part, which is brought in contact therewith just prior to use, comprises a condensation reaction product of an aldehyde and a primary or secondary amine to induce the free radical decomposition of the diazonium salt.

2. Description of the Prior Art

Disclosed in the prior art are many curable adhesive compositions which cure or set by free radical polymerization of ethylenically unsaturated polymerizable monomers. The prior art relative to curable adhesives discloses free radical initiators which are of the organic peroxy or hydroperoxy type including peresters or peracids. Especially useful are the peresters and peroxides such as t-butyl perbenzoate and cumene hydroperoxide. Also disclosed in the prior art are curing adhesive compositions employing aldehyde-amine condensation reaction products as free radical accelerators and primers for these peroxy compounds. Also disclosed in the prior art are anaerobic curing adhesive compositions employing diazonium salts as latent polymerization catalysts.

U.S. Pat. No. 3,591,438 to Toback et al is directed to adhesive compositions containing a mixture of a polymerizable acrylate ester monomer and a peroxy polymerization initiator employed with a primer comprising a mixture of an aldehyde-amine condensation product and a reducing activator selected from the group consisting of defined sulfur containing free radical accelerators and compounds containing an oxidizable transition metal.

U.S. Pat. No. 3,616,040 to Toback discloses peroxy-initiated cure of acrylate based compositions where the cure is accelerated by use of a condensation reaction product Of dn aldehyde and a primary or secondary amine.

U.S. Pat. Nos. 3,890,407 and 4,106,971, both to Briggs et al, disclose employment of a condensation reaction product of an aldehyde and a primary or secondary amine to cure adhesive compositions comprising a solution of chlorosulfonated polyethylene or mixtures of sulfonyl chlorides and chlorinated polymers in polymerizable vinyl monomers. Other ingredients such an an organic salt of a transition metal, a peroxy compound and a tertiary amine may also be included in the adhesive compositions.

U.S. Pat. No. 4,182,644 to Briggs et al discloses use of a condensation reaction product of an aldehyde and a primary or secondary amine to accelerate the cure of adhesive compositions comprising a polymer, a monomer, and a free-radical generator derived from an organic sulfonyl chloride and/or a chlorosulfonated polymer.

U.S. Pat. No. 3,880,956 to Skoultchi discloses anaerobic curing compositions comprising mixtures of polymerizable acrylic and substituted acrylic monomers and diazonium salts as latent polymerization catalysts therefor. The invention is directed to anaerobic, one part adhesives.

There is a recognized need in the adhesive art for adhesives which are stable to heat and stable to storage for periods of at least six months. On use, however, the cure of the adhesive must be rapid providing strong bonds within a short period of time. In the present invention the diazonium salts provide improved heat and storage stability to the adhesives as compared to adhesives employing peroxy or hydroperoxy systems. Depending largely on the diazonium salt and the monomer base selected, typical fast curing adhesives can be formulated to remain stable, i.e., not cure or lose reactivity, for periods of six months to one year. Also depending on the selection of the diazonium salt and the selection of the aldehyde-amine condensation reaction product and other components, adhesives can be formulated having a wide range of cure speeds. Thus, adhesives can be formulated within the invention having a slow, moderate (about 60–120 seconds) or fast (about 15–30 seconds) cure. The invention provides a versatility in formulating a variety of adhesives useful in specific end-use applications.

SUMMARY OF THE INVENTION

We have now found that stable, curable adhesives can be formulated based on the free radical initiated cure of adhesive acrylic monomers employing a diazonium salt in the presence of an aldehyde-amine condensation reaction product. The adhesives are stable (prior to combining of the two parts) and can exhibit a fast cure and strong bonds.

The two part adhesives herein comprise a first part (monomer base component) formed of a mixture of free radical polymerizable acrylic or substituted acrylic monomer(s), as later described, together with diazonium salt(s) in an amount sufficient to initiate polymerization, ordinarily from about 0.01 to 10% or more, based on the weight of the monomer(s). A second part comprises an activator which functions to induce decomposition of the diazonium salt to produce free-radicals. The activators herein are selected from the condensation reaction products of aldehydes and primary or secondary amines. The adhesives are formed just prior to use where the second part containing the activator is placed in contact with the first part. In forming the adhesive the activator component is usually applied as a primer or coating to the substrate to be bonded. The monomer component can be applied either to the surface which has been treated with the activator or to the appropriate uncoated mating surface. Alternatively, the two parts may be mixed together in suitable proportions just prior to application.

The activator condensation product may be used on an "as is" basis or it may be dissolved in a suitable solvent. In some applications, the solvent may include an acrylic or methacrylic monomer and/or include a propellant thereby permitting application of the activator by aerosol spraying of the substrate. A suitable volatile solvent is methylchloroform. Representative monomers which may be used in the activator component include isobornyl methacrylate, tetrahydrofurfuryl methacrylate and cyclohexyl methacrylate. Monomers containing hydroxyl or carboxyl groups such as, for example, hydroxyethyl methacrylate or methacrylic acid are incompatible with the present activators and may polymerize spontaneously.

DETAILED DESCRIPTION OF THE PRESENT INVENTION

One class of polymerizable monomers useful in the present compositions correspond to the general formula:

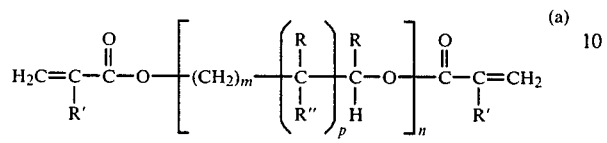
(a)

wherein

R is selected from the group consisting of hydrogen methyl, ethyl,

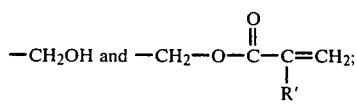

$R'$ is selected from the group consisting of hydrogen, chlorine, methyl and ethyl;

$R''$ is selected from the group consisting of hydrogen, hydroxy, and

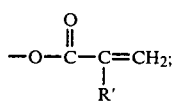

m is an integer equal to at least 1, e.g. from 1 to 8 or higher and preferably from 1 to 4 inclusive;

n is an integer equal to at least 1, e.g. from 1 to 20 or more; and p is one of the following: 0 or 1.

Monomers useful in this invention and which come within the above general formula include, for example, ethylene glycol dimethacrylate, ethylene glycol diacrylate, polyethylene glycol diacrylate, tetraethylene glycol dimethacrylate, diglycerol diacrylate, diethylene glycol dimethacrylate, and other polyether diacrylates and dimethacrylates.

The above class of monomers is in essence described in U.S. Pat. No. 3,043,820 issued July 10, 1962 (to R. H. Krieble).

A second class of polymerizable monomers useful in the present compositions correspond to the general formula:

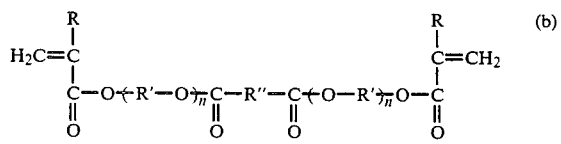
(b)

wherein

R represents hydrogen, chlorine, methyl or ethyl, $R'$ represents alkylene with 2-6 carbon atoms, $R''$ represents $(CH_2)_m$ in which m is an integer of from 0 to 8,

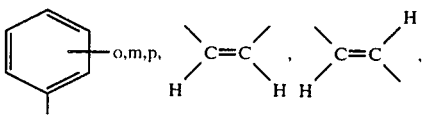

n represents an integer of from 1 to 4.

Typical monomers of this class include, for example, dimethacrylate of bis(ethylene glycol) adipate, dimethacrylate of bis(ethylene glycol) maleate, dimethacrylate of bis(diethylene glycol) phthalate, dimethacrylate of bis(tetraethylene glycol) phthalate, dimethacrylate of bis(tetraethylene glycol) sebacate, dimethacrylates of bis(tetraethylene glycol) maleate, and the diacrylates and chloroacrylates corresponding to said dimethacrylates, and the like.

The above class of monomers is in essence described in U.S. Pat. No. 3,457,212 issued July 22, 1969 (Sumitomo Chemical Company, Ltd.).

Also useful herein are monomers which are isocyanate-hydroxyacrylate or isocyanate-aminoacrylate reaction products which may be characterized as acrylate terminated polyurethanes and polyureides or polyureas. These monomers correspond to the general formula:

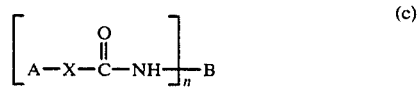
(c)

wherein

X is selected from the group consisting of —O— and

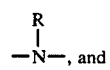

R is a member selected from the group consisting of hydrogen and lower alkyl of 1 to 7 carbon atoms;

A represents the organic residue of an active hydrogen containing acrylic ester wherein the active hydrogen has been removed, the ester being hydroxy or amino substituted on the alkyl portion thereof and the methyl, ethyl and chlorine homologs thereof;

n is an integer from 1 to 6 inclusive; and

B is a mono- or polyvalent organic radical selected from the group consisting of alkyl, alkylene, alkenyl, cycloalkyl, cycloalkylene, aryl, aralkyl, alkaryl, poly(oxyalkylene), poly(carboalkoxyalkylene), and heterocyclic radicals both substituted and unsubstituted.

Typical monomers of this class include the reaction product of mono- or polyisocyanate, for example, toluene diisocyanate, with an acrylate ester containing a hydroxy or amino group in the non-acrylate portion thereof, for example, hydroxyethyl methacrylate.

The above class of monomers is in essence described in U.S. Pat. No. 3,425,988 issued Feb. 4, 1969 (Loctite Corp).

Another class of monomers useful in the present application are the mono- and polyacrylate and methacrylate esters of bisphenol type compounds. These monomers may be described by the formula:

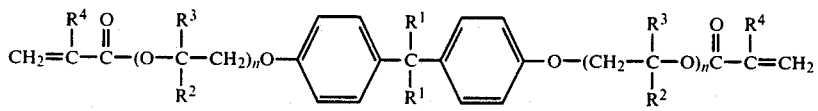

where
- $R^1$ is methyl, ethyl, carboxyl or hydrogen;
- $R^2$ is hydrogen, methyl or ethyl;
- $R^3$ is hydrogen, methyl or hydroxyl;
- $R^4$ is hydrogen, chlorine, methyl or ethyl and
- n is an integer having a value of 0 to 8.

Representative monomers of the above-described class include: dimethacrylate and diacrylate esters of 4,4'-bis-hydroxyethoxy-bisphenol A; dimethacrylate and diacrylate esters of bisphenol A; etc. These monomers are essentially described in Japanese Patent Publication No. 70-15640 (to Toho Chemical Manuf. Ltd.).

In addition to the monomers already described, other useful monomers are monofunctional acrylate and methacrylate esters and the hydroxy, amide, cyano, chloro, and silane substituted derivatives thereof. Such monomers include, for example, methyl acrylate, methyl methacrylate, ethyl acrylate, ethyl methacrylate, hydroxyethyl methacrylate, hydroxypropyl acrylate, hydroxypropyl methacrylate, butyl acrylate, n-octyl acrylate, 2-ethylhexyl acrylate, decylmethacrylate, dodecyl methacrylate, cyclohexyl methacrylate, tert.-butyl methacrylate, acrylamide, N-methylolacrylamide, diacetone acrylamide, N-tert.-butyl acrylamide, N-tert.-octyl acrylamide, N-butoxyacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like.

The monomers useful herein are seen to be polymerizable monomers having one or more acrylic or substituted acrylic groups as a common, unifying characteristic, and for convenience may be generically termed acrylic and substituted acrylic monomers.

It is understood that the various monomers useful herein are not required to be in a highly purified state. The monomers may be comprised of commercial grades in which inhibitors, stabilizers, or other additives or impurities may be present, as well as those prepared in the laboratory or in pilot plant scale.

In preparing these curable compositions, it is within the scope of the present invention that the required acrylic monomer may be a mixture of acrylic monomers rather than a single acrylic monomer, and there may also be utilized, in combination therewith, other non-acrylic, ethylenically unsaturated copolymerizable comonomers such as unsaturated hydrocarbons, unsaturated esters and ethers, vinyl esters, and the like. Typical optional comonomers include: vinyl acetate, methyl vinyl ether, methyl vinyl ketone, poly(ethylene maleate), allyl alcohol, allyl acetate, 1-octene, styrene, etc.

In certain applications, and largely dependent on the particular acrylic monomer being utilized, such non-acrylic, polymerizable comonomer(s) may be added to constitute up to about 60%, by weight, of the monomer composition. Preferably, however, the optional non-acrylic comonomer will constitute no more than 50%, by weight, of the monomer composition, and most preferably, it will constitute no more than 30%, by weight, of the monomer composition.

Optionally, the compositions may also contain a minor amount, up to 50%, by weight, of a polymeric thickener, for example, a low or high molecular weight polymer or prepolymer. Illustrative of such polymeric thickeners is a commercially available methacrylate polymer sold by E. I. duPont de Nemours & Company, under the trademark ELVACITE. For example, through inclusion of particular types of modifying polymers, compositions in accordance with the present invention are obtained which provide impact-resistant, high-strength bonds on curing and which therefore are particularly suitable as structural adhesives. The properties of the cured adhesive are largely determined by the selection of the monomers.

In order to further modify the properties of these compositions, they may optionally contain plasticizers such, for example, as dibutyl phthalate or triethylene glycol. Other optional ingredients include, inorganic thickeners, organic and inorganic fillers, cut glass fibers, as well as visible dyes or ultraviolet fluorescent dyes.

The adhesive compositions herein utilize stable or stabilized diazonium salts corresponding to the general formula:

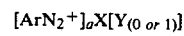

In the above formula, a is an integer of 1, 2 or 3 taken so as to equalize the valence charge of the salt and Ar is any aryl or substituted aryl radical and includes diazonium substituted aryl radicals. X is an anion such as is ordinarily found in know diazonium salts and is taken so as to act as a counterion to the aryl diazonium cation moiety of the salt. X includes, for example, $F^-$, $Cl^-$, $Br^-$, $SO_4^{--}$, $HSO_4^-$, $Ar'SO_3^-$, $Ar'(SO_3)_2^{--}$, and $Ar'(SO_3)_3^{---}$; Ar' is an aryl or substituted aryl radical. Y represents a stabilizing agent for the diazonium salt such as are well known in the art and may or may not be present. Y includes, for example, $ZnCl_2$, $BF_3$, $HgCl_2$, $PtCl_2$, $PtCl_4$, and $AuCl_3$. In usual practice, the stabilizing agent complexes with the diazonium salt and therefore is present in approximately stoichiometric amounts. Many diazonium salts in which the anion is selected from the group $SO_4^{--}$, $HSO_4^-$, $Ar'SO_3^-$, and $Ar'(SO_3)_2^{---}$, may not require a stabilizing agent.

For illustrative purposes, typical diazonium salts useful in the compositions of the invention include, for example, bis(2-methyl-4-chlorobenzenediazonium) naphthalenedisulfonate, bis(2-methoxy-4-nitrobenzenediazonium) naphthalenedisulfonate, bis[4-(N,N-diethylamino)-2-methoxybenzenediazonium] tetrafluoroborate, bis(3-nitro-4-chlorobenzenediazonium) tetrachlorozincate, bis (4-nitrobenzenediazonium) sulfate, 1,4-tetramethylene bis(4,4'-diazo) benzoate zinc chloride complex and bis[4-(N-phenylamino) benzenediazonium] sulfate.

The amount of diazonium salt required is an amount effective to initiate polymerization of the monomer. For most applications the amount of diazonium salt will range from about 0.01 or less to 10% or more, based on the weight of the monomer. The preferred amount will range from about 0.2 to 2%, based on the weight of the monomer. It can be understood that mixtures of diazonium salts may also be employed herein.

If the dissolving of the initiator in the monomer presents a problem, or if a relatively larger amount of particular initiator is necessary in connection with a monomer in which solubility is difficult, then solvents which dissolve the diazonium salt and themselves are soluble in the monomer may be employed. Common solvents for diazonium salts are described in the literature and include, for example, alkanols such as methanol, ethanol, butanol, substituted and unsubstituted formamides such as formamide and N,N-dimethyl formamide, and water. Methanol and ethanol are the preferred solvents. In most instances, only a minimum amount of solvent is used to dissolve the diazonium salt.

The compositions can be formulated with or without a stabilizer compound added to the monomeric composition to prevent or retard the premature decomposition of the diazonium salt initiator. Useful stabilizer compounds are materials classified in the chemical literature as Lewis acids and their salts. They include the stabilizing agents previously described in connection with the stabilizing of the diazonium salts as well as, for example, sulfosalicylic acid, sulfuric acid, toluene sulfonic acid, naphthalene disulfonic acid, naphthalene trisulfonic acid, and the lithium, sodium, and potassium salts of these acids, aluminum chloride, phosphoric acid, alkyl phosphoric acids, alkyl phosphates, etc. When such optional stabilizer compounds are used, they are used in concentrations of from about 0.001 to 1%, by weight, of the total composition. The desirability or necessity of utilizing these stabilizer compounds can easily be recognized by the practitioner in the art.

Optionally, part one of the adhesive system may also contain saccharin. The saccharin component may either be present as saccharin or as the copper salt of saccharin or as a mixture thereof. The saccharin component is generally present in amounts of from 0.01 to 10%, by weight, of the monomer or to the limit of solubility of the materials in the monomer. Preferably, the saccharin component will be present in amounts of 0.1 to 5%, by weight, of the monomer. Other soluble copper (II) salts may be advantageously included in the adhesives herein. For example, copper naphthenate or copper octoate, can be included in an amount of 0.001% to 0.5%, typically 0.02%, by weight, of the monomer. Saccharin, optionally, may be included in the accelerator portion of the adhesive system, preferably in the absence of copper salts.

In order to prepare the first part of the adhesive compositions herein, it is merely necessary to mix the desired amount of diazonium salt with the selected acrylic monomer or monomers which may optionally contain non-acrylic copolymerizable monomer. Optional ingredients, as mentioned above, are ordinarily included as desired in the first part.

In preparing the aldehyde-amine condensation reaction product, the aldehyde will preferably be an aliphatic aldehyde having 1-12 carbon atoms. Thus aldehydes such as formaldehyde, acetaldehyde, propionaldehyde and butyraldehyde can be used in preparing the condensation product herein. The amines used in the condensation reaction are not critical and may be any primary, or secondary aliphatic or aromatic amine. Thus amines such as ethyl amine, butyl amine, diethyl amine, dipropyl amine, aniline, diphenyl amine and many others are suitable. Useful condensation products can be prepared using a range of proportions of aldehyde to amine, but ordinarily the reactants will be employed with an excess of aldehyde. Useful condensation products are described in U.S. Pat. Nos. 3,591,438 to Toback et al., and 3,616,040 to Toback. Particularly preferred condensation reaction products are the butyraldehyde-aniline and butyraldehyde-butylamine condensation products sold by E. I. duPont de Nemours & Co. under the tradenames "Accelerator 808" and "Accelerator 833", respectively.

The monomer component can be applied either to the surface which has been treated with the activator or to the appropriate mating surface to be bonded. The bonding operation is then carried out in a conventional manner by placing the two mating surfaces in abutting relationship and applying a moderate compressive force, if desired, to produce a relatively thin layer of adhesive between the two surfaces. A final adhesive thickness of from 0.01 to 0.15 mm is preferred when using the adhesives of the present invention.

The amount of the activator component employed should be sufficient to ensure efficient initiation of the compositions during curing. Generally, amounts of activator equal to about 0.001 to about 5.0%, by weight, of the acrylic monomer are sufficient and amounts in substantive excess thereof will be unnecessary and may even adversely affect the strength of the final bond. While it is not easy to determine the amount of activator applied to a given surface, adequate results are obtained with a single application by aerosol or otherwise of a thin film of the activator component to at least one of the surfaces to be bonded.

In order to maintain or increase the bond strength of the resultant cured polymer, one may utilize an acrylic monomer having an alcoholic or other relatively polar group substituted thereon. Examples of such polar groups in addition to the hydroxy group include, carboxyl, amino, amido, cyano, mercapto, and halogen polar groups. Hydroxy group containing monomers are preferred. Esters having a labile hydrogen atom or atoms are also desirable. Examples of acrylic monomers within this category include hydroxyethyl acrylate, hydroxypropyl acrylate, hydroxyethyl methacrylate, hydroxypropyl methacrylate, diacetone acrylamide, 2-cyanoethyl acrylate, 3-cyanopropyl acrylate, 2-chloroethyl acrylate, glycerol monomethacrylate, 2-hydroxy-3-chloropropyl methacrylate, etc.

Where the effect of a polar substituted monomer is desired without its actual use, in some instances a small amount (usually no more than 8%, by weight, of the total composition) of an alkanol may be admixed to the composition. Such useful alkanols include, for example, methanol, ethanol, isopropanol, butanol, etc. While analogous mercapto compounds may be used in place of the alkanols with a comparable beneficial effect, their use is not favored mainly because of their unpleasant, strong odor.

The compositions of this invention cure (polymerize or set) at ambient temperatures but heat may be used to accelerate the rate of curing. Compositions containing significant amounts of hydroxy substituted acrylic monomer are further crosslinked by the application of heat resulting in increased bond strength.

The following examples will further describe and illustrate the practice of this invention but they are not intended to limit its scope. In these examples the compositions were prepared by mixing the indicated ingredients in amounts given as parts by weight (pbw) unless otherwise specified. In the examples, the following testing procedures are employed to measure the comparative properties of the various adhesives.

Tensile Shear Strength:

The tensile shear strength is measured by first adhesively bonding two steel bars (0.125" by 4" by 0.5") with the test adhesive. The bars are bonded to their 0.5" surface with a 0.5" overlap yielding a bond area of 0.25 square inches. The bonded samples are held in a jig for about 24 hours at room temperature to ensure full curing of the adhesive. The samples are then mechanically pulled apart with an Instron Tensile Tester providing the pulling force set at a speed of 0.01 inches per minute. The desired tensile values at failure are noted in pounds per square inch.

Impact Strength:

The impact strength is measured by first adhesively bonding two steel blocks where the lower block measures 1" by 1¾" and the upper block measures 1" by 1" and following the procedure of ASTM-D-950-72.

EXAMPLES 1–10

These examples illustrate various curable adhesive compositions of the invention and their cure speed, tensile shear strength on steel and impact strength on steel. The adhesive of Example 1 contains no diazonium salt and is a comparative example not within the invention.

A polyurethane oligomer was first prepared for use as a portion of the monomer base of part one of the adhesive. The polyurethane oligomer was prepared in conventional manner by reacting polypropylene glycol 100 with an excess of toluene diisocyanate. The residual isocyanate end groups were reacted with hydroxyethyl methacrylate (HEMA) and the treated polyurethane oligomer (PUO) was then diluted with HEMA to form a 30% solution of the oligomer and in that form was employed to formulate adhesive compositions as identified below.

|  | EXAMPLE | | | | | | | | | |
|---|---|---|---|---|---|---|---|---|---|---|
|  | 1 | 2 | 3 | 4 | 5 | 6 | 7 | 8 | 9 | 10 |
| PUO diluted with HEMA | 95 | 95 | 95 | 95 | 95 | 95 | 95 | 95 | 95 | 95 |
| Methacrylic acid | 5 | 5 | 5 | 5 | 5 | 5 | 5 | 5 | 5 | 5 |
| Saccharin | 0 | 0 | 1 | 1 | 2 | 1 | 1 | 1 | 1 | 5 |
| p-Toluene sulfonic acid | 0 | 0 | 0.2 | 0.2 | 0 | 0.2 | 0.2 | 0.2 | 0.2 | 0.05 |
| Copper naphthenate | 0 | 0 | 0 | 0 | 0 | 0.02 | 0 | 0.2 | 0.5 | 0.02 |
| 4-Diazo-N,N—diethylaniline tetrafluoroborate | 0 | 1 | 1 | 2 | 2 | 1 | 0 | 0 | 0 | 0 |
| 4-Diazo-N,N—diethylaniline tetrachlorozincate | 0 | 0 | 0 | 0 | 0 | 0 | 1 | 1 | 1 | 5 |

Each of the adhesive monomer bases was applied to one surface of a glass substrate. A 30% solution of Accelerator 808 in isobornyl methacrylate was applied on another glass substrate and the two coated surfaces were placed in abutting relationship. The "cure time" (i.e. the time required to prevent movement of the two substrates by hand) was then determined and recorded as shown in Table I, as were the strengths of the adhesive bonds.

TABLE I

| Example # | Cure Time | Tensile Shear Strength on Steel* | Impact Strength On Steel** |
|---|---|---|---|
| 1 | >24 hours | 0 | 0 |
| 2 | 120 sec. | 3000 | 9.4 |
| 3 | 125 sec. | 2800 | 11.9 |
| 4 | 90 sec. | 2700 | 10.2 |
| 5 | 90 sec. | 2600 | 10.3 |
| 6 | 30 sec. | 2400 | 9.2 |
| 7 | 120 sec. | 2800 | 11.0 |
| 8 | 15 sec. | 2500 | Not tested |
| 9 | 15 sec. | 1700 | " |
| 10 | 60 sec. | 2000 | " |

*pounds per square inch
**foot-pounds

EXAMPLES 11–16

Additional adhesive compositions were prepared using a variety of diazonium salts as given below.

The formulation of Example 3 was repeated employing, in place of 4-diazo-N,N-diethylaniline tetrafluoroborate, diazonium salts as follows:

Ex. 11: 1-diazo-2-naphthol-4-sulfonic acid
Ex. 12: 2-diazo-4-chloroanisole tetrachlorozincate
Ex. 13: 4-diazo-2,5-diethoxyphenylmorpholine tetrachlorozincate
Ex. 14: 4-diazo-1-morpholinobenzene tetrafluoroborate
Ex. 15: 4-diazodiphenylamine sulfate
Ex. 16: 4-diazo-N-ethyl-N-hydroxyethyl tetrachlorozincate Test results obtained with these adhesive compositions are given in Table II.

TABLE II

| Example No. | Cure Time | Tensile Shear Strength on Steel |
|---|---|---|
| 11 | 60 sec. | 2600 psi |
| 12 | 90 sec. | 2200 psi |
| 13 | 130 sec. | 2600 psi |
| 14 | 125 sec. | 2900 psi |
| 15 | 200 sec. | 1800 psi |
| 16 | 120 sec. | 2900 psi |

Additional adhesive compositions were prepared where the monomer composition of the first part was varied. Thus, in preparing the polyurethane oligomer, in Example 17, the polypropylene glycol 100 employed in Examples 1–16 was replaced by tetraethylene glycol. In Example 18, the toluene diisocyanate employed in Examples 1–16 was replaced by methylene di(phenyl isocyanate), and in Example 19 the toluene diisocyanate was replaced by methylene di(phenyl isocyanate) and tetraethylene glycol was used in place of polypropylene glycol 100.

The formulation of Example 2 was repeated with the modified polyurethane oligomers, and a cure time for each of the compositions was obtained as follows:

Cure Time

Example 17: 160 sec.
Example 18: 120 sec.
Example 19: 140 sec.

EXAMPLES 20–21

These examples illustrate adhesive compositions where acrylic polyesters are employed in preparing part 1 of the adhesive system. Thus, in Example 20, 40 parts of poly(butylene maleate) dimethacrylate (MW 2000) was dissolved in 60 parts of hydroxyethyl methacrylate and used as the monomeric component of the first part. In Example 21, 40 parts of poly(propylene glycol) dimethacrylate (MW 1025) was dissolved in 60 parts of hydroxyethyl methacrylate and used as the monomeric component of the first part. The formulation of the adhesives is given as follows:

|  | Example 20 | Example 21 |
|---|---|---|
| Monomer (as described above) | 95 | 95 |
| Methacrylic acid | 5 | 5 |
| Saccharin | 1 | 1 |
| 4-diazo-N,N—diethylaniline tetrafluoroborate | 1 | 1 |

The accelerator part of the system employed a 30% by weight solution of Accelerator 833 in isobornyl methacrylate.

A cure time for each of the compositions was obtained as follows:

Cure Time

Example 20: 90 sec.
Example 21: 65 sec.

As will be recognized by those skilled in the art, the present invention provides stable, curable adhesive compositions which can be prepared to provide a wide range of cure speeds. The majority of adhesives will have a cure time of less than four minutes with some adhesives having a cure time of less than one minute. Variations may be made in ingredients, proportions and procedures as long as such variations are within the scope and spirit of the following claims.

What is claimed is:

1. A curable adhesive composition comprising in combination (a) a first part comprising free radical polymerizable acrylic or substituted acrylic monomer(s) and diazonium salt in an amount sufficient to initiate polymerization of said monomer(s), and in contact therewith (b) a second part comprising an activator to induce the decomposition of said diazonium salt wherein the activator is an aldehyde-amine condensation reaction product.

2. The curable adhesive composition of claim 1 wherein the diazonium salt corresponds to the formula $$[ArN_2^+]_a X[Y_{(0\ or\ 1)}]$$

wherein
Ar is an aryl or substituted aryl radical,
X is an anion selected from the group consisting of $F^-$, $Cl^-$, $Br^-$, $SO_4^{--}$, $HSO_4^-$, $Ar'SO_3^-$, $Ar'(SO_3)_2^{--}$, and $Ar'(SO_3)_3^{---}$; Ar' is an aryl or substituted aryl radical,
a is an integer of 1, 2 or 3 taken so as to equalize the valence charge of the diazonium salt, and Y is a stabilizing agent for the diazonium salt selected from the group consisting of $ZnCl_2$, $BF_3$, $HgCl_2$, $PtCl_2$, $PtCl_4$, and $AuCl_3$.

3. The composition of claim 2 further containing stabilizer compound selected from the group consisting of Lewis acids and salts thereof.

4. The curable adhesive composition of claim 1 wherein the diazonium salt in the first part is present in an amount from about 0.01 to 10% based on the weight of the monomer(s).

5. The curable adhesive composition of claim 4 further containing saccharin in an amount of from 0.01 to 10% based on the weight of the monomer(s).

6. The curable adhesive composition of claim 4 further containing soluble copper (II) salt.

7. The curable adhesive composition of claim 1 wherein the acrylic or substituted acrylic monomer of the first part is a member of the group consisting of compounds of the formula:

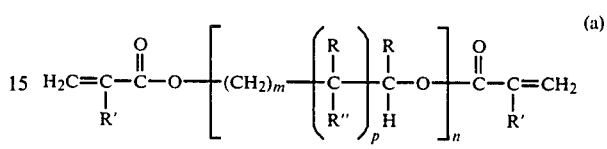

wherein
R is selected from the group consisting of hydrogen methyl, ethyl,

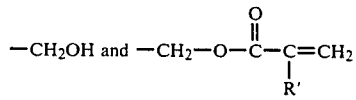

R' is selected from the group consisting of hydrogen, chlorine, methyl and ethyl;
R" is selected from the group consisting of hydrogen, hydroxy, and

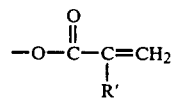

m is an integer from 1 to 8, and
n is an integer from 1 to 20, and
p is 0 or 1;

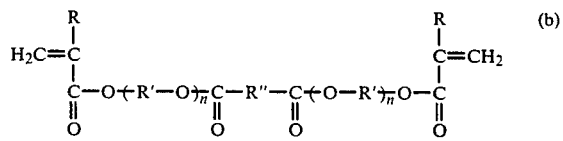

wherein
R represents hydrogen, chlorine, methyl or ethyl,
R' represents alkylene with 2–6 carbon atoms,
R" represents $(CH_2)_m$ in which m is an integer of from 0 to 8,

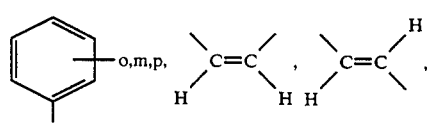

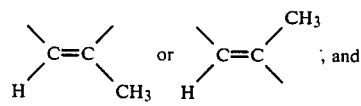

n represents an integer of from 1 to 4;

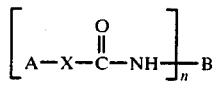

wherein

X is selected from the group consisting of —O— and

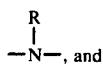

R is a member selected from the group consisting of hydrogen and lower alkyl of 1 to 7 carbon atoms;

A represents the organic residue of an active hydrogen containing acrylic ester wherein the active hydrogen has been removed, the ester being hydroxy or amino substituted on the alkyl portion thereof and the methyl, ethyl and chlorine homologs thereof;

n is an integer from 1 to 6 inclusive; and

B is a mono- or polyvalent organic radical selected from the group consisting of alkyl, alkylene, alkenyl, cycloalkyl, cycloalkylene, aryl, aralkyl, alkaryl, poly(oxyalkylene), poly(carboalkoxyalkylene), and heterocyclic radicals both substituted and unsubstituted;

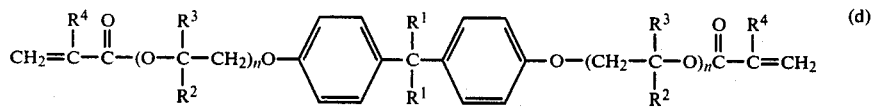

where

R$^1$ is selected from the group consisting of methyl, ethyl, carboxyl and hydrogen;

R$^2$ is selected from the group consisting of hydrogen, methyl and ethyl;

R$^3$ is selected from the group consisting of hydrogen, methyl and hydroxyl;

R$^4$ is selected from the group consisting of hydrogen, chlorine, methyl and ethyl, and n represents an integer of from 0 to 8; and (e) monofunctional acrylate and methacrylate esters and the hydroxy, carboxyl, amide, cyano, chloro, and silane substituted derivatives thereof.

8. The curable adhesive composition of claim 1 wherein the acrylic or substituted acrylic monomer comprises hydroxyethyl methacrylate.

9. The curable adhesive composition of claim 1 wherein the acrylic or substituted acrylic monomer further comprises a polyurethane oligomer.

10. The curable adhesive composition of claim 1 wherein the acrylic or substituted acrylic monomer comprises poly(butylene maleate) dimethacrylate or poly(propylene glycol) dimethacrylate.

11. The curable adhesive composition of claim 1 wherein the accelerator comprises the condensation reaction product of butyraldehyde and butyl amine or butyraldehyde and aniline, and the accelerator further comprises isobornyl methacrylate.

12. The composition of claim 1 wherein the diazonium salt is bis[4-(N,N-diethylamino)benzenediazonium] tetrachlorozincate or the composition of claim 1 wherein the diazonium salt is bis[4-(N,N-diethylamino)-2-methoxybenzenediazonium] tetrafluoroborate.

13. The composition of claim 1 wherein the diazonium salt is bis[4-(N,N-dimethylamino)benzenediazonium] tetrachlorozincate.

14. The composition of claim 1 wherein the diazonium salt is bis[4(-N-ethyl-N-hydroxyethylamino)benzenediazonium] tetrachlorozincate or 2-methoxy-4-(3'-methoxy-4'-diazobenzenediazonium) tetrachlorozincate.

15. The composition of claim 1 wherein the diazonium salt is bis(2-methyl-4-chlorobenzenediazonium)-naphthalenedisulfonate.

16. The composition of claim 1 wherein the diazonium salt is bis(2-chlorobenzenediazonium) tetrachlorozincate or bis (2,5-dichlorobenzenediazonium) tetrachlorzincate.

17. The composition of claim 1 wherein the diazonium salt is bis(2-methoxy-4-nitrobenzenediazonium) tetrachlorozincate or bis[4-(N-phenylamino)benzenediazonium] sulfate.

18. The composition of claim 1 wherein the diazonium salt is 4-diazo-N,N-diethylaniline tetrafluoroborate or bis(4-nitrobenzenediazonium) tetrafluoroborate.

19. The composition of claim 1 wherein the diazonium salt is bis[4-(N-phenylamino)benzenediazonium] sulfate.

20. A of method bonding closely facing surfaces which comprises interposing between said surfaces the curable adhesive composition of claim 1, placing the surfaces in an abutting relationship, and permitting the adhesive to cure.

21. An article bonded with an adhesive composition comprising (a) a first part comprising in combination free radical polymerizable acrylic or substituted acrylic monomer(s) and diazonium salt in an amount sufficient to initiate polymerization of said monomer(s), and in contact therewith (b) a second part comprising an activator to induce the decomposition of said diazonium salt wherein the activator is selected from the group consisting of aldehyde-amine condensation reaction products.

22. The article of claim 21 wherein the diazonium salt corresponds to the formula

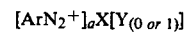

wherein

Ar is an aryl or substituted aryl radical,

X is an anion selected from the group consisting of F$^-$, Cl$^-$, Br$^-$, SO$_4^{--}$, HSO$_4^-$, Ar'SO$_3^-$, Ar'(SO$_3$)$_2^{--}$, and Ar'(SO$_3$)$_3^{---}$; Ar' is an aryl or substituted aryl radical, a is an integer of 1, 2 or 3 taken so as to equalize the valence charge of the diazonium salt, and Y is a stabilizing agent for the diazonium salt selected from the group consisting of ZnCl$_2$, BF$_3$, HgCl$_2$, PtCl$_2$, PtCl$_4$, and AuCl$_3$.

* * * * *